US006766039B1

(12) United States Patent
Al-Sheikh

(10) Patent No.: US 6,766,039 B1
(45) **Date of Patent: *Jul. 20, 2004**

(54) USER AUTHORIZATION SYSTEM CONTAINING A USER IMAGE

(76) Inventor: Zaher Al-Sheikh, 33252 Breckenridge Dr., Sterling Heights, MI (US) 48310

( * ) Notice: Subject to any disclaimer, the term of this patent is extended or adjusted under 35 U.S.C. 154(b) by 0 days.

This patent is subject to a terminal disclaimer.

(21) Appl. No.: 09/198,621

(22) Filed: Nov. 24, 1998

Related U.S. Application Data

(63) Continuation-in-part of application No. 09/016,099, filed on Jan. 30, 1998, now Pat. No. 6,137,895.

(60) Provisional application No. 60/060,817, filed on Oct. 1, 1997.

(51) Int. Cl.[7] .......... G06K 9/00

(52) U.S. Cl. .......... 382/115; 382/118

(58) Field of Search .......... 382/115, 118, 382/100; 335/384, 375, 376; 283/77, 86, 93, 74, 72, 900; 380/23, 25

(56) References Cited

U.S. PATENT DOCUMENTS 3,258,277 A 6/1966 Schuster .......... 462/53
3,671,059 A 6/1972 Zeller .......... 283/74
3,755,935 A 9/1973 Annenberg .......... 283/94
3,758,970 A 9/1973 Annenberg .......... 283/82
4,001,073 A 1/1977 Jones et al. .......... 156/516
4,094,719 A 6/1978 Jones et al. .......... 156/250
4,226,036 A * 10/1980 Krug .......... 40/665
4,377,047 A * 3/1983 Adams, Jr. et al. .......... 40/665
4,507,166 A 3/1985 Posner .......... 156/235
4,544,184 A * 10/1985 Freund et al. .......... 283/94
4,711,994 A * 12/1987 Greenberg .......... 235/384
4,754,487 A * 6/1988 Newmuis .......... 382/118
4,865,351 A 9/1989 Smithson et al. .......... 283/58
5,051,565 A * 9/1991 Wolfram .......... 235/384
5,139,847 A 8/1992 Breen .......... 428/40.1
5,272,025 A 12/1993 Wheeler .......... 430/14
5,421,619 A * 6/1995 Dyball .......... 283/86
5,505,494 A * 4/1996 Belluci et al. .......... 283/75
5,525,969 A * 6/1996 LaDue .......... 340/573
5,572,371 A * 11/1996 Woolf .......... 359/802
5,606,365 A 2/1997 Maurinus et al. .......... 348/222
5,978,493 A * 11/1999 Kravitz et al. .......... 382/115
6,016,618 A * 1/2000 Attia et al. .......... 40/633
6,137,895 A * 10/2000 Al-Sheikh .......... 382/115

* cited by examiner

*Primary Examiner*—Leo Boudreau
*Assistant Examiner*—Duy M. Dang
(74) *Attorney, Agent, or Firm*—Gifford, Krass, Groh, Sprinkle, Anderson & Citkowski, P.C.

(57) ABSTRACT

A user authorization system including printing a human cognizable digital image of a user onto an article. The article being a bracelet, a pass key, a placard, a legal citation, a vehicle rental agreement and a tag. The human cognizable image optionally being stored in a computer memory in combination with personal user information, the memory to be accessed to verify user authorization.

4 Claims, 3 Drawing Sheets

FIG - 2
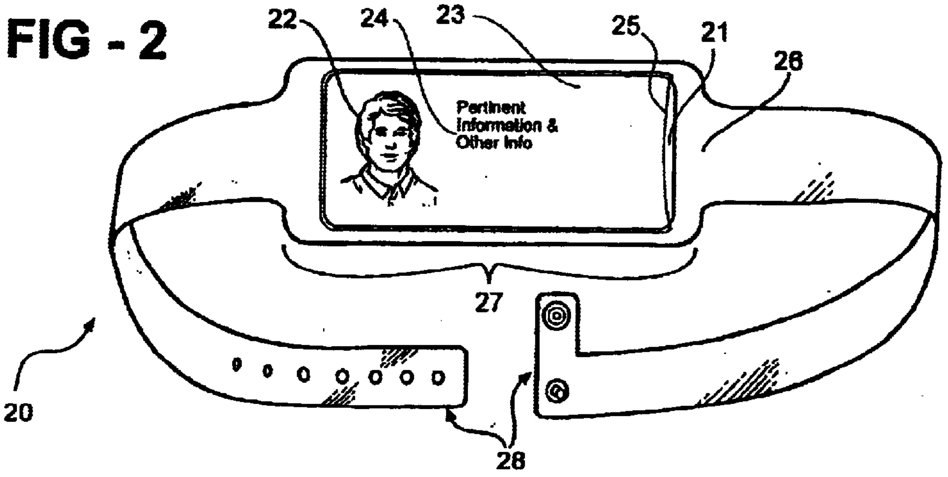
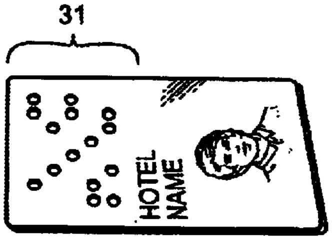
FIG - 3
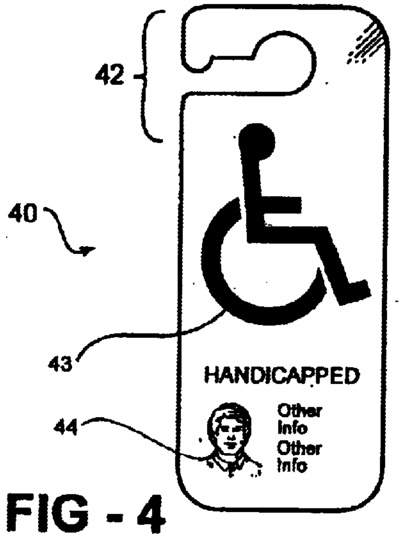
FIG - 4
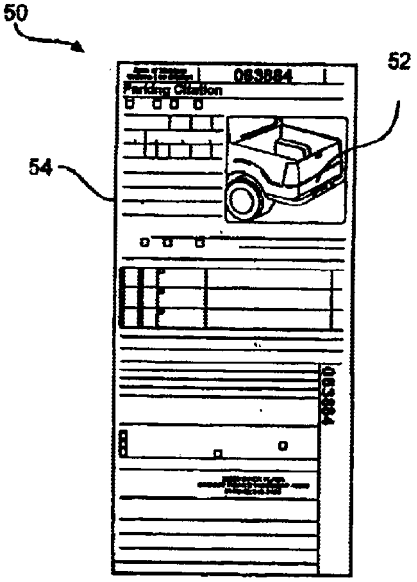
FIG - 5
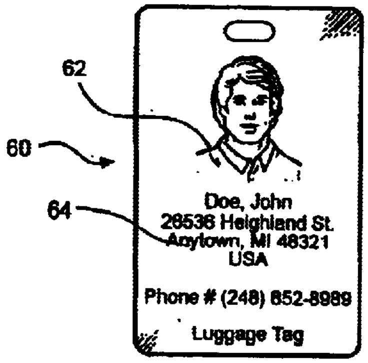
FIG - 6

USER AUTHORIZATION SYSTEM CONTAINING A USER IMAGE

RELATED APPLICATIONS

This patent application is a continuation-in-part of patent application Ser. No. 09/016,099 filed Jan. 30, 1998, now U.S. Pat. No. 6,137,895 entitled "Photo Boarding Pass", which was based on provisional application Serial No. 60/060,817 filed Oct. 1, 1997, entitled "Method for Verifying the Identity of a Passenger".

FIELD OF THE INVENTION

This invention relates to a method for verifying the identity of a user, more particularly the invention involves printing a human cognizable digital image of the user on an article to facilitate security verification.

BACKGROUND OF THE INVENTION

Concerns over the ever-increasing sophistication of terrorism and drug trafficking have prompted transportation networks to utilize increased security procedures, in order to keep pace. Traditional security protocols dictate heightened security perimeters surrounding sensitive areas, as one approaches those areas. For example, the sensitive area of an airport is the aircraft itself. While runways and secure aircraft service areas are protected by a badge and uniform system by which only authorized personnel are permitted access to various secure areas, this system is not amenable to controlling aircraft access by passengers. Current security doctrine involves allowing access to airport terminals to the public upon passing a metal detector screening. Upon presenting a ticket and perhaps a form of photo-identification, a passenger is issued a boarding pass which designates the flight particulars of the passenger. The issuance of a boarding pass may occur on either side of the metal detection screening. The present system fails in that there are no means available to verify whether the passenger presenting a boarding pass upon gaining access to the aircraft, is in fact the passenger of record. In this way, the secure nature of the aircraft to only authorized passengers is compromised.

The weaknesses of the conventional security systems in regard to the presentation of a boarding pass by a person other than the passenger of record are not practically solved with existing methods. The addition of a passenger identification checkpoint using picture identification at the point of gateway embarkation is not feasible, owing to the time-consuming nature of a checkpoint. A checkpoint procedure under ideal conditions requires about thirty seconds per passenger and results in delays in loading the aircraft. This process is further slowed by passengers fumbling for picture identification stored in baggage, purses, wallets and the like. Thus, there exists a need for a method of verifying a passenger's identity at the time of boarding the transport that does not involve the use of a separate piece of picture identification.

Security at airports, passenger ships, train and bus stations, as well as other central transportation sites is a concern for all who utilize conveyances such as airplanes, trains and buses. Various systems are utilized to verify the identity of a passenger prior to boarding such a conveyance. For example, the identity of the passenger is typically verified at the time the ticket is purchased, at the time the boarding pass is issued or during passenger check-in. Because the identity of a passenger is not typically verified after the purchase of the ticket or after the issuance of the boarding pass, there is an opportunity for a ticket purchased by one passenger to be utilized by another passenger. Thus, there remains a need for a simple system which will permit the verification of the identity of a passenger at the time of boarding the particular conveyance.

There is a growing need for a system to prevent impersonation of an authorized user in order to gain access to restricted areas. Often the impersonator has criminal intentions in gaining access to restricted areas. While security cameras and patrols are effective in preventing burglaries and forced entry into restricted areas, there is as yet little that can be done to prevent a seemingly authorized user from accessing such an area. An impersonator may presently gain access to a hotel room or other such facility by claiming to be an occupant who has misplaced their pass key. An equally troubling crime involving impersonation is noted in the hospital nursery setting. An impersonator alleging to be a parent or relative of the newborn infant visits the ward and merely bundles the newborn and removes it from the nursery.

The hospital setting is also susceptible to confusing the identity of patients leading to the improper delivery of medication, surgical procedure and testing. This problem is compounded by the use of numerical patient identification and rotating hospital staff.

Confusion or impersonation of identity has both security and convenience aspects in the travel setting. For example, a luggage tag affirmatively identifying the owner of an article acts as a deterrent to mistaken collection of an article, as well as theft. A rapid method of verifying ownership of transported articles would improve transportation system efficiency. In a vehicle rental setting, similar benefits would be realized in being able to rapidly verify the identity of an authorized vehicle operator.

In addition, parking and law enforcement officials are regularly confronted with the problem of bringing forth evidence in judicial proceedings that a parking or vehicular violation, respectively, has occurred. A system which provides documentary evidence supporting the issuance of a violation would serve to affirm legitimate violations and also preclude the issuance of improper violations. Another aspect of parking code enforcement susceptible to abuse involves handicap parking authorization.

Currently, most governmental units provide for special parking and other considerations for handicapped motorists and passengers. Frequently, the number of nonhandicapped persons utilizing such placards is so great that there are inadequate handicapped parking spaces for the truly disabled. Thus, there exists a need for a system of verifying whether a motorist is indeed authorized to take advantage of the privileges afforded to the handicapped.

SUMMARY OF THE PRESENT INVENTION

The present invention provides a user authorization system including a human cognizable digital image associated with a user which is printed onto a substrate with the substrate being affixed to a bracelet. The bracelet having a transparent polymeric sheet overlying a backing sheet that forms a pocket adopted to receive the substrate and having a band extending from the pocket adapted to secure about a human limb and a user data file containing user personal information and a verifiable image associated with the user. The user authorization system may include in combination a human cognizable digital image associated with a user with the image being printed onto a substrate, the substrate being incorporated into a user authorized pass key to an electronic lock and a computer terminal which is capable of accessing an image associated with the user which is stored in a computer database for verifying user authorization upon loss or damage to the key.

The user authorization system of the present invention includes a placard adapted to be suspended from a vehicle rearview mirror, the placard having indicia indicating a user to be handicapped as well as the user's name and a human cognizable digital image of the user. The present invention also finds utility in providing a human cognizable digital image of an individual or a vehicle at the time that a law enforcement or parking enforcement violation is written, respectively. The present invention also finds utility in including a human cognizable digital image of a permitted driver upon a vehicle rental agreement in order to verify authorized users of the vehicle in combination with a computer memory file containing information of the agreement and a verifiable image of the permitted operator.

The present invention satisfies this need by providing a method for verifying the identity of a passenger at the time of boarding. The method includes the steps of initially verifying the identity of a passenger prior to the time of boarding. For example, the identity of the passenger may be verified at the travel agent or airline counter when the ticket is purchased and travel arrangements are made. Alternately, the identity of the passenger may be verified upon check-in at the transportation site. Next, a photographic image of the passenger who has purchased the ticket is taken with a device capable of generating and outputting an electronic image. The photographic image is taken in a manner that prevents the passenger from changing places with another person following identity verification. A variety of digital cameras are available which enable an electronic image to be taken of an individual and which output an electronic image. Illustratively, devices capable of generating an electronic image include charged coupled device (CCD) arrays and video analog camera/video frame grabber systems. It is appreciated that a relatively low quality image is sufficient for operation of the present invention. For instance a 256 gray scale image renders comparison possible without consuming undue computer storage space. Higher quality images including color are also operative herein.

BRIEF DESCRIPTION OF THE DRAWING

FIG. 2 depicts a perspective view of a user authorization system of the present invention configured as a bracelet.

FIG. 3 depicts a perspective view of a user authorization system of the present invention configured as an electronic pass key.

FIG. 4 depicts a planar view of a user authorization system of the present invention configured as a placard.

FIG. 5 depicts a planar view of a user authorization system of the present invention configured as a parking citation.

FIG. 6 depicts a planar view of a user authorization system of the present invention configured as a luggage tag.

DETAILED DESCRIPTION OF THE INVENTION

Figure 1:
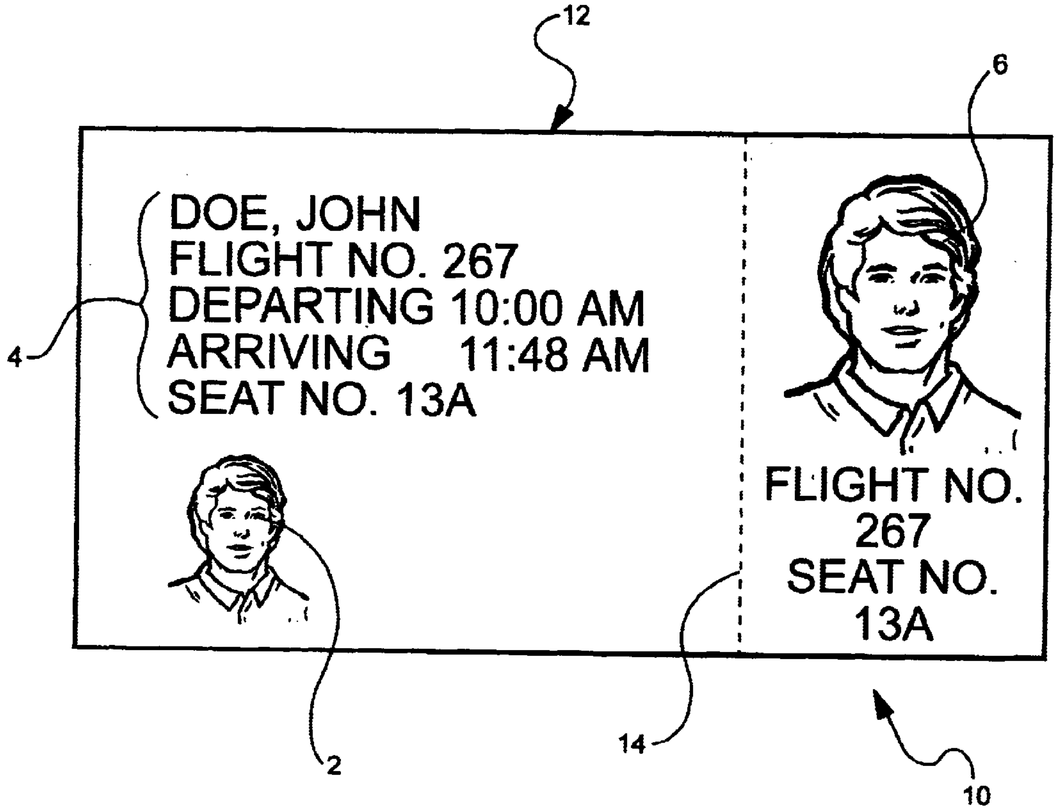
FIG. 1 depicts an embodiment of a conveyance ticket of the present invention.
Figure 7:
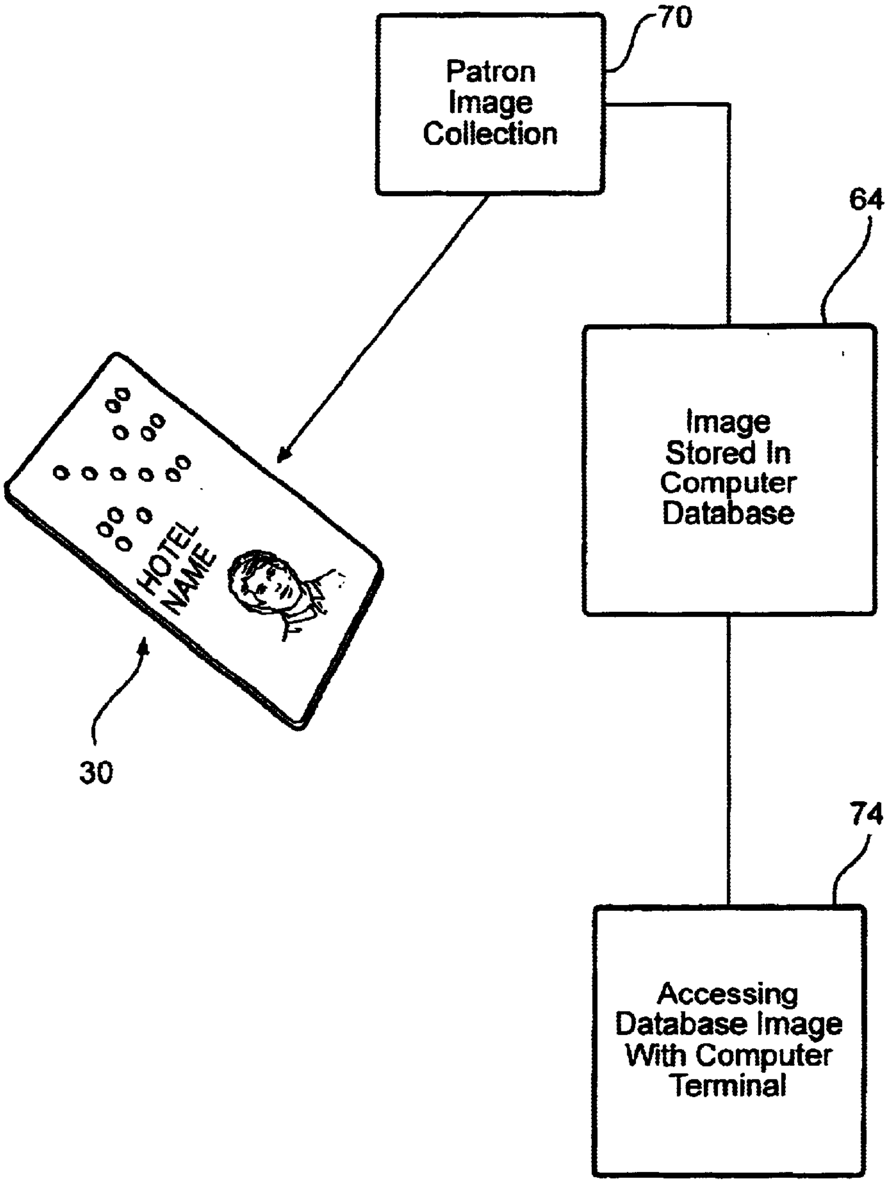
FIG. 7 depicts a flow chart of operative steps of an embodiment of the instant invention for patron authorization in an innkeeper setting.

The present invention involves the printing of a human cognizable digital image associated with a user onto various articles to promote security, avoid misidentification or to serve as documentary evidence. Since the user associated image is in digital form, the image is amenable to storage in a computer data file in combination with the user data in order to provide an additional level of user verification.

A human cognizable digital image of the present invention is collected using conventional electronic imaging devices and printing equipment interfaced thereto, details of which are discussed herein.

The present invention is discussed herein in reference to passenger aircraft transportation, not as a means of limitation, but rather is intended to be exemplary of the invention utility. One skilled in the art will readily appreciate the applicability of the present invention to user identification in the transportation contexts illustratively including: cruise ships, ski-lifts, vehicle rentals, rail- and bus-lines.

Upon purchase of a conveyance ticket or at the time travel arrangements are made, the identity of the user is verified and an electronic image of the purchasing user is taken, with a device capable of generating an electronic image. Alternatively, the user identity is verified upon check in at the transportation site. Illustratively, devices capable of generating an electronic image include charged coupled device (CCD) arrays and video analog camera/video frame grabber systems.

The electronic image is input to a printer which prints a human-cognizable image of the user onto a boarding pass 10 which is depicted in FIG. 5. Any dissimilarity between the person requesting a boarding pass and the user of record thus becomes obvious to the issuing agent by visual comparison of the printed image 2 and the person requesting the pass. Upon a user presenting a conveyance ticket, a boarding pass of the present invention is then issued. Owing to relatively low quality of the image 2, such as a 256 gray scale image, the printing of the human cognizable image does not significantly decrease the speed at which an agent distributes passes. It is appreciated that a higher quality image in terms of gray scale tones or color is also operative herein. Preferably, the information on the travel itinerary 4 of the user is also printed onto the boarding pass at this time, although the electronic image may be printed onto a boarding pass already containing such information. It is further appreciated that a conveyance ticket itself is amenable to use a substrate for the printing of a human-cognizable image of the present invention, especially in instances where a boarding pass separate from the ticket is not issued.

An additional human-cognizable image 6 may be printed on the boarding pass, thus enabling an image to be printed on passes having several separable portions. The retention of a portion of the pass having the user's image thereon optionally allows for additional verification stages following boarding.

The boarding pass substrate 12 is generally composed of a semi-rigid rectilinear portion of paper or cardboard. Preferably, the substrate 12 has a perforation line 14 transecting the substrate. The substrate being printed with a blank conveyance form (not shown). The form is formatted to accept individualized travel itinerary details 4 of the user within blank sections thereof The individualized travel details illustratively including: user name, user destination, transport designation, departure time, arrival time, seat assignment, travel class, transport tariff and the like. In particular to aircraft transport the details may include flight number and meal selection information. A portion of the blank form being open for the printing of the human cognizable image of the user.

The user then proceeds to the boarding site with the boarding pass. At the time of boarding, or upon arrival at the boarding site, the human-cognizable image on the boarding pass is compared with the user presenting the boarding pass to ensure that the user who purchased the ticket is the same user who is boarding the conveyance.

The security of the transport is enhanced by user verification occurring at the time of boarding. The identity verification method of the present invention is considerably quicker than that using picture identification because the verifying agent merely glances at the face of the user and their presented boarding pass.

In a preferred embodiment, the electronic image of the user is associated with the travel arrangements of the user and stored in a centralized database. The database storage of a user image with travel arrangements provides for subsequent security monitoring and for the tracking of criminal suspects traveling with counterfeit identification. Furthermore, image data coupled with travel itinerary data is optionally utilized outside of a security setting to provide demographic user information, for targeting transport promotional offers, and verification of non-transference of special fares and benefits extended to particular users.

In an alternative embodiment, the human-cognizable electronic image, and other individualized travel details, illustratively including: user name, user destination, departure time, arrival time, seat assignment, travel class, transport tariff, et al., are tied electronically to a unique alphanumeric code, printable in alphanumeric and in bar code format.

All pertinent text-based individualized travel details then are printed upon the boarding pass, along with the unique alphanumeric code, in alphanumeric and bar code format. Upon boarding, or at any other prior or subsequent security checkpoint, the bar code is read with a bar code scanner, which then causes the individualized travel details to be referenced, and the human-cognizable digital image to be displayed upon a video screen interfaced with the bar code scanner at the security checkpoint. This image is then compared with the individual presenting the boarding pass.

The unique alphanumeric code also is provided in alphanumeric format to enable manual entry of the code in the event of difficulty reading the printed bar code. It is appreciated that the alphanumeric and bar code formatted information is optionally printed in duplicate on separable portions of the boarding pass.

In still another embodiment, the camera taking the image of the user may directly apply the image to the boarding pass by using either photosensitive material in at least a portion of the boarding pass in a POLAROID-type system or by directly transferring the electronic image created by a digital camera to the boarding pass.

An identification bracelet of the present invention is denoted generally at 20 in FIG. 2. A substrate 23 is printed with a human cognizable digital image associated with a user 22. The substrate 24 is a flexible sheet of material, illustratively including paper, cardboard and polymeric materials. Substrate 23 is wetted by the plurality of ink pixels which make up the human cognizable digital image 22. The substrate 23 is configured to provide a portion thereof for the inclusion of user information such as the user name, an assigned user number and the like. User information and indicia 24 being included to define the nature of the authorization and the user status. The substrate 23 having printed thereon indicia 24 and an image 22 is then inserted into a pocket 21 formed by fusing at least two parallel sides of a top layer 25 and a bottom layer 26 to a flexible polymeric material. The top layer 25 is transparent so that after insertion of the substrate 23 into the pocket 21 the image 22 is viewable. Attached to either the top layer 25 or the bottom layer 26 are straps 27 designed to secure about a human limb. Preferably the limb being an arm. The straps 27 have an adjustable fastening means 28 for securing. It is appreciated that the straps 27 may be continuous with one another to form a solid band. The band being secured to the human limb by conventional fastening means.

The bracelet 20 is illustratively used in a hospital setting. A patient is admitted and given a bracelet of the present invention. The image and the patient information is thereafter stored in a computer user data file. The image on the bracelet being that of the patient, with the same image being verifiable against the image within the data file. Optionally, the image is also printed on a patient chart. The verifiable image and the bracelet serve as a check to assure that the patient is being given his own treatment regime. It is appreciated that the instant invention is also operative in nursing home and day care settings.

Alternatively, an infant in a natalogy ward is banded with a bracelet of the present invention which has an image of the infant user's mother or father printed thereon, in addition to the infant user information. In this way, an adult other than the individual imaged on the infant user bracelet could be readily restricted from access to the infant by hospital personnel.

A pass key incorporating the present invention is shown generally at 30 in FIG. 3. Pass key 30 includes lock insertion portion 31 for deactivating a lock mechanism. The lock is a conventional device that is deactivated by a magnetic strip or an arrangement of through-holes or protrusions on the lock insertion portion 31 of the pass key 30. Adjacent to the lock insertion portion 31, a human cognizable digital image of an authorized user 32 is printed onto the pass key 30. Optionally, indicia 33 are also included on the pass key 30. A pass key of the present invention finds utility in an innkeeper setting. A patron having a disposable key imprinted with his image gains entry to his lodgings with the key. The image after being collected 70 and printed on the key is stored in a computer database 72. The computer database being accessible by way of a computer terminal 74. The database being accessed upon an individual alleging to be a patron who has lost or damaged his pass key.

The user authorization system of the present invention configured as a placard is shown in FIG. 4. The placard 40 includes a fixturing portion 42 adapted to be suspended from a vehicle rearview mirror. The placard 40 has indicia 43 indicating a user to be handicapped and further includes the user's name, duration of placard validity and the like. The placard further includes a human cognizable digital image 44 of the user.

FIG. 5 represents a parking citation of the present invention, shown generally at 50. The parking citation identifies a vehicle parked in noncompliance with governmental parking regulations. Upon a parking code enforcement officer logging a violation into an electronic storage device and writing a citation therefrom, the parking code enforcement officer collects a human cognizable digital image of the vehicle. An image 52 of the vehicle at the time of the violation is printed onto the citation 50. The citation is proportioned to include citation information and indicia of the citation 54. A human cognizable digital image 52 is stored in a computer memory in combination with the information of the citation. It is appreciated that the present invention is also applicable to vehicular law enforcement and especially traffic enforcement. In traffic enforcement, a digital image of the violator is printed onto a citation in combination with an image of a radar speed recordation value triggering the citation. These aspects of the present invention are also operative in providing documentary evidence of a traffic violation.

A human cognizable digital image of an authorized operator of a vehicle is printed onto a vehicle rental agreement creating the authorization. The image after being collected and printed on the agreement is stored in a computer database in combination with user information. The computer database being accessible by way of a computer terminal. Thus, the identity of an authorized vehicle operator is checked by personnel comparing the rental agreement image with the vehicle operator prior to releasing the vehicle from renter custody.

FIG. 6 shows a luggage tag of the present invention generally at 60. The luggage tag includes a human cognizable digital image 62 of a luggage owner. The luggage tag 60 is proportioned to incorporate owner information 64 including owner name, owner address and owner telephone number. The luggage tag 60 includes an attachment means to an article of luggage (not shown). The attachment means including an adhesive backing, a strap passing through a perforation in the luggage tag 60 and about a portion of the article of luggage. It is appreciated that the tag 60 is adaptable for use as a pet tag, where the owner's image and address is printed thereon.

One skilled in the art will readily appreciate that the present invention is well adapted to carry out the objects and provide the applications mentioned, as well as those inherent therein. Modifications and variations within the spirit of the invention will occur to those skilled in the art. Such modifications are also intended to fall within the scope of the appended claims.

What is claimed is:

1. A user authorization system comprising in combination:

a human cognizable digital image associated with a user comprising a plurality of ink pixels printed onto a substrate, said substrate being a flexible sheet wetted by the plurality of ink pixels wherein said substrate is affixed to a bracelet;

said bracelet having a transparent polymeric sheet overlying a backing sheet, the polymer sheet and backing sheet forming a pocket with opposing sides, the pocket adapted to receive said substrate, said bracelet having a band extending from the opposing sides of the pocket, the band adapted to secure about a human limb; and a user data file wherein said user data file comprises user personal information and a verifiable image associated with the user.

2. The user authorization system of claim 1 wherein said image is that of a newborn baby of the user.

3. The user authorization system of claim 1 wherein said image is of a parent of the user.

4. The user authorization system of claim 1 wherein said image is that of the user and said user data file is a patient chart.

* * * * *